United States Patent
McCormack

(10) Patent No.: US 11,603,940 B2
(45) Date of Patent: Mar. 14, 2023

(54) DAMPED CHECK VALVE HAVING MULTI-PRESSURE OPERATION

(71) Applicant: Jimroy Arner McCormack, Holland, MI (US)

(72) Inventor: Jimroy Arner McCormack, Holland, MI (US)

(73) Assignee: Woodward, Inc., Fort Collins, CO (US)

( * ) Notice: Subject to any disclaimer, the term of this patent is extended or adjusted under 35 U.S.C. 154(b) by 367 days.

(21) Appl. No.: 15/951,991

(22) Filed: Apr. 12, 2018

(65) Prior Publication Data
US 2019/0316696 A1 Oct. 17, 2019

(51) Int. Cl.
*F16K 17/02* (2006.01)
*F16K 17/04* (2006.01)
*G05D 7/01* (2006.01)

(52) U.S. Cl.
CPC ........ *F16K 17/025* (2013.01); *F16K 17/0413* (2013.01); *G05D 7/014* (2013.01); *Y10T 137/7925* (2015.04); *Y10T 137/7929* (2015.04); *Y10T 137/7932* (2015.04); *Y10T 137/7933* (2015.04)

(58) Field of Classification Search
CPC ......... Y10T 137/7933; Y10T 137/7932; Y10T 137/7925; Y10T 137/785–7853; F16K 17/025; F16K 17/0413; G05D 7/014
See application file for complete search history.

(56) References Cited

U.S. PATENT DOCUMENTS

| | | | | |
|---|---|---|---|---|
| 1,434,473 A | * | 11/1922 | Arnold | F01L 3/10 251/322 |
| 1,517,511 A | * | 12/1924 | Howarth | F01L 1/18 29/217 |
| 2,351,874 A | * | 6/1944 | Parker | F16K 17/196 137/493.8 |
| 2,583,295 A | * | 1/1952 | Greer | B60T 11/32 251/16 |

(Continued)

FOREIGN PATENT DOCUMENTS

| CN | 1534203 A | 10/2004 |
|---|---|---|
| CN | 104819129 A | 8/2015 |

(Continued)

*Primary Examiner* — Craig M Schneider
*Assistant Examiner* — Frederick D Soski
(74) *Attorney, Agent, or Firm* — Reinhart Boerner Van Deuren P.C.

(57) ABSTRACT

A damped check valve having multi-pressure operation is provided. The check valve includes a liner with a poppet movable within the liner. The liner defines a flow passage aligned along a longitudinal axis defined by the liner. A biasing element is operably coupled between the poppet and the liner to bias a first flow face of the poppet against an annular seat. The first flow face is configured such that a first fluid pressure is required to move the poppet from the closed position to an open position wherein the poppet is unseated from the annular seat and a second fluid pressure is required to hold the poppet in the open position, the second pressure being less than the first pressure. There is a sufficient diametrical clearance between the poppet and the liner which allows for flow control at pressures which are less than the initial opening pressure.

18 Claims, 6 Drawing Sheets

(56) References Cited

U.S. PATENT DOCUMENTS

| | | | | |
|---|---|---|---|---|
| 2,645,242 A * | 7/1953 | Monnich | F16K 15/063 | 137/493.9 |
| 2,972,227 A * | 2/1961 | Allen | F02K 9/68 | 60/258 |
| 3,018,792 A * | 1/1962 | Brucker | F16K 17/082 | 137/469 |
| 3,156,259 A * | 11/1964 | Havelka | B01D 35/147 | 137/516.23 |
| 3,164,164 A * | 1/1965 | Cordes | F16K 17/0493 | 137/467 |
| 3,202,177 A * | 8/1965 | Klein | F16K 17/046 | 137/514.7 |
| 3,334,659 A * | 8/1967 | Magorien | F16L 37/34 | 138/39 |
| 3,727,636 A * | 4/1973 | Simmons | F02M 59/46 | 137/541 |
| 3,742,701 A * | 7/1973 | Feemster | F02K 9/52 | 60/258 |
| 3,800,824 A * | 4/1974 | Medina | F16K 15/063 | 137/541 |
| 4,084,609 A * | 4/1978 | Johnson | F16K 17/06 | 137/327 |
| 4,148,338 A * | 4/1979 | Skoli | F16K 15/063 | 137/454.2 |
| 4,504,081 A | 3/1985 | Shimizu et al. | | |
| 4,574,836 A * | 3/1986 | Barnard, Jr. | B01D 35/143 | 137/469 |
| 4,935,127 A * | 6/1990 | Lowsky | B01D 27/103 | 210/130 |
| 4,990,247 A * | 2/1991 | Vandenberk | B01D 27/103 | 137/541 |
| 5,078,324 A * | 1/1992 | DuBell | F23D 11/107 | 239/407 |
| 5,137,050 A * | 8/1992 | Clarke | F16K 1/465 | 137/541 |
| 5,918,628 A | 7/1999 | Harding | | |
| 9,488,107 B2 * | 11/2016 | Rodrigues | F23K 5/147 | |
| 9,857,080 B2 * | 1/2018 | Chabaille | F23K 5/147 | |
| 10,400,911 B2 * | 9/2019 | Gilbert | F02M 69/54 | |
| 10,415,713 B1 * | 9/2019 | Chapman | F16K 1/42 | |
| 10,428,957 B2 * | 10/2019 | Tibbs | F16J 15/3236 | |
| 2003/0041905 A1 * | 3/2003 | Andersson | F16K 15/026 | 137/541 |
| 2003/0084941 A1 * | 5/2003 | Fischer | F16K 1/12 | 137/541 |
| 2006/0037647 A1 | 2/2006 | Okuda et al. | | |
| 2008/0047621 A1 | 2/2008 | Ittlinger et al. | | |
| 2010/0037615 A1 | 2/2010 | Williams et al. | | |
| 2010/0096028 A1 * | 4/2010 | Qiu | F16K 15/026 | 137/538 |
| 2014/0130908 A1 * | 5/2014 | Prnce | F16K 17/0413 | 137/537 |
| 2014/0305521 A1 * | 10/2014 | Burke | F23N 1/007 | 137/512 |
| 2014/0347867 A1 * | 11/2014 | Chapman | F16K 17/04 | 362/362 |
| 2015/0211500 A1 | 7/2015 | Kumazawa et al. | | |
| 2016/0215891 A1 * | 7/2016 | Thomson | F23K 5/147 | |
| 2017/0368903 A1 * | 12/2017 | Kesler | F16K 15/063 | |

FOREIGN PATENT DOCUMENTS

| | | |
|---|---|---|
| DE | 28 27 189 A1 | 1/1980 |
| GB | 2029548 A | 3/1980 |

* cited by examiner

DAMPED CHECK VALVE HAVING MULTI-PRESSURE OPERATION

FIELD OF THE INVENTION

This invention generally relates to fuel injections systems, and more particularly to devices responsible for controlling fuel flow through a fuel nozzle.

BACKGROUND OF THE INVENTION

Fuel injectors have been used in many applications relating to air-breathing propulsion systems, including, for example, in ramjets, scramjets, and in gas turbine engines such as those used in aviation. Generally speaking, these systems typically include a section for compressing inlet air, a combustion section for combusting the compressed air with fuel, and an expansion section where the energy from the hot gas produced by combustion of the fuel is converted into mechanical energy. The exhaust gas from the expansion section may be used to achieve thrust or as a source of heat and energy.

Such injectors typically employ a nozzle from which the fuel exits just prior to combustion. Flow to and out of this nozzle must be carefully controlled to ensure adequate combustion across a wide range of operating conditions. As a result, a variety of flow devices must be utilized to ensure that an adequate flow rate of fuel at a desired pressure is provided.

One such device is the check valve, which is readily known to permit fuel flow in one direction along a flow path, but prevent fuel flow in the opposite direction. Such check valves operate under a constant opening and closing pressure. In other words, a specific pressure is required to open and close the check valve.

However, due to the operating nature of certain applications, e.g. aerospace applications, the pressure of the fuel, and hence the pressure acting upon the check valve, is known to change. Such factors which attribute to this are operating cycle, elevated temperatures in the fuel, changes in altitude, etc.

As such, there is a need in the art for a check valve which can readily adapt to such dynamic conditions. The invention provides such a check valve. These and other advantages of the invention, as well as additional inventive features, will be apparent from the description of the invention provided herein.

BRIEF SUMMARY OF THE INVENTION

In one aspect, the invention provides a check valve. An embodiment according to this aspect includes a liner. The liner defines a flow passage aligned along a longitudinal axis defined by the liner. This embodiment of a check valve also includes a poppet. The poppet has a first flow face which faces the flow passage and an opposed second flow face. A biasing element is operably coupled between the poppet and the liner to bias the first flow face against an annular seat defined by the liner in a closed position. The first flow face is configured such that a first fluid pressure is required to move the poppet from the closed position to an open position wherein the poppet is unseated from the annular seat and a second fluid pressure is required to hold the poppet in the open position, the second pressure being less than the first pressure.

In an embodiment according to this aspect, a first portion having a first area of the first flow face is arranged such that fluid will contact the first portion in the closed position. A second portion having a second area greater than the first area of the first flow face is arranged such that fluid will contact the second portion when the poppet is unseated from the annular seat in an open position.

In an embodiment according to this aspect, the flow passage has an inlet portion and an outlet portion downstream from the inlet portion relative to a direction of the flow of fluid through the flow passage. An axially extending sidewall of the poppet is interposed between the first and second flow faces.

In an embodiment according to this aspect, the poppet is movable from the closed position to an open position wherein the poppet is unseated from the annular seat and from the open position to a full open position, wherein the in the full open position an entirety of the axially extending sidewall is downstream relative to the direction of fluid flow through the flow passage from a downstream edge of the outlet portion. Such a configuration allows for limiting a full open position for more precise flow control.

In an embodiment according to this aspect, a radial clearance is formed between the axially extending sidewall and the outlet portion of the flow passage such that a leakage flow is permitted from the inlet portion through the outlet portion in the open position.

In an embodiment according to this aspect, the check valve also includes a seal situated in the poppet such that a portion of the seal is exposed on the first flow face.

In another aspect, the invention provides a check valve. An embodiment according to this aspect includes a liner defining a flow passage aligned along a longitudinal axis defined by the liner. This embodiment also includes a poppet having a first flow face and a second flow face. A biasing element is operably coupled between the poppet and the liner to bias the first flow face against an annular seat defined by the liner in a closed position. A first portion having a first area of the first flow face is arranged such that fluid will contact said first portion in the closed position. A second portion of the first flow face having a second area greater than the first area is arranged such that fluid will contact said second portion when the poppet is unseated from the annular seat in an open position.

In an embodiment according to this aspect, the first flow face is configured such that a first fluid pressure is required to move the poppet from the closed position to an open position wherein the poppet is unseated from the annular seat and a second fluid pressure is required to hold the poppet in the open position, the second pressure being less than the first pressure.

In an embodiment according to this aspect, the flow passage has an inlet portion and an outlet portion downstream from the inlet portion relative to a direction of the flow of fluid through the flow passage. An axially extending sidewall of the poppet is interposed between the first and second flow faces. The poppet is movable from the closed position to an open position wherein the poppet is unseated from the annular seat and from the open position to a full open position, wherein the in the full open position an entirety of the axially extending sidewall is downstream relative to the direction of fluid flow through the flow passage from a downstream edge of the outlet portion.

In an embodiment according to this aspect, a radial clearance is formed between the axially extending sidewall and the outlet portion of the flow passage such that a leakage flow is permitted from the inlet portion through the outlet portion in the open position.

In an embodiment according to this aspect, a retainer is affixed to the poppet with the biasing element trapped between the retainer and the liner.

In an embodiment according to this aspect, a plurality of inlet ports are formed through the liner such that fluid surrounding an exterior of the liner is in communication with the flow passage via the plurality of inlet ports.

In an embodiment according to this aspect, the inlet portion of the flow passage has a first diameter and the outlet portion of the flow passage has a second diameter greater than the first diameter.

In yet another aspect, the invention provides a check valve. An embodiment according to this aspect includes a liner defining a flow passage aligned along a longitudinal axis defined by the liner. The flow passage has an inlet portion and an outlet portion downstream from the inlet portion relative to the direction of the flow of fluid through the flow passage. This embodiment also includes a poppet having a first flow face and a second flow face. An axially extending sidewall of the poppet is interposed between the first and second flow faces. A biasing element is operably coupled between the poppet and the liner to bias the first flow face against an annular seat defined by the liner in a closed position of the check valve. The poppet is movable from the closed position to an open position wherein the poppet is unseated from the annular seat and from the open position to a full open position, wherein the in the full open position an entirety of the axially extending sidewall is downstream relative to the direction of fluid flow through the flow passage from a downstream edge of the outlet portion. A radial clearance is formed between the axially extending sidewall and the outlet portion of the flow passage such that a leakage flow is permitted from the inlet portion through the outlet portion in the open position.

In an embodiment according to this aspect, the first flow face is configured such that a first fluid pressure is required to move the poppet from the closed position to an open position wherein the poppet is unseated from the annular seat and a second fluid pressure is required to hold the poppet in the open position. The second pressure is less than the first pressure.

In an embodiment according to this aspect, a first portion having a first area of the first flow face is arranged such that fluid will contact said first portion in the closed position. A second portion having a second area greater than the first area is arranged such that fluid will contact said second portion when the poppet is unseated from the annular seat in the open position.

In an embodiment according to this aspect, a portion of the inlet portion of the flow passage is a variable volume damping cavity formed between a first damping face of the poppet and a second damping face of the liner. A volume of the damping cavity varies based on a position of the poppet within the liner. A radial clearance is formed between the first damping face and the inlet portion of the flow passage such that a leakage flow is permitted from the damping cavity to the remainder of the inlet portion of the flow passage.

In an embodiment according to this aspect, the inlet portion of the flow passage has a first diameter and the outlet portion of the flow passage has a second diameter greater than the first diameter.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, FIGS. 1-5 illustrate an exemplary embodiment of a damped check valve having multi-pressure operation (referred to herein as a "valve") according to the teachings herein. As will be understood from the following, such a valve is designed such that fluid flow through the valve can be controlled at pressures lower than the initial opening pressure of the valve. In operation, the valve opens at an initial opening fluid pressure acting on a poppet of the valve but may be held open at a considerably lower operating fluid pressure than that of the initial operating pressure. Indeed, the valve will remain in a fully open position until the fluid pressure acting on the poppet is at a closing pressure. This closing pressure is less than the initial opening pressure.

Figure 1:
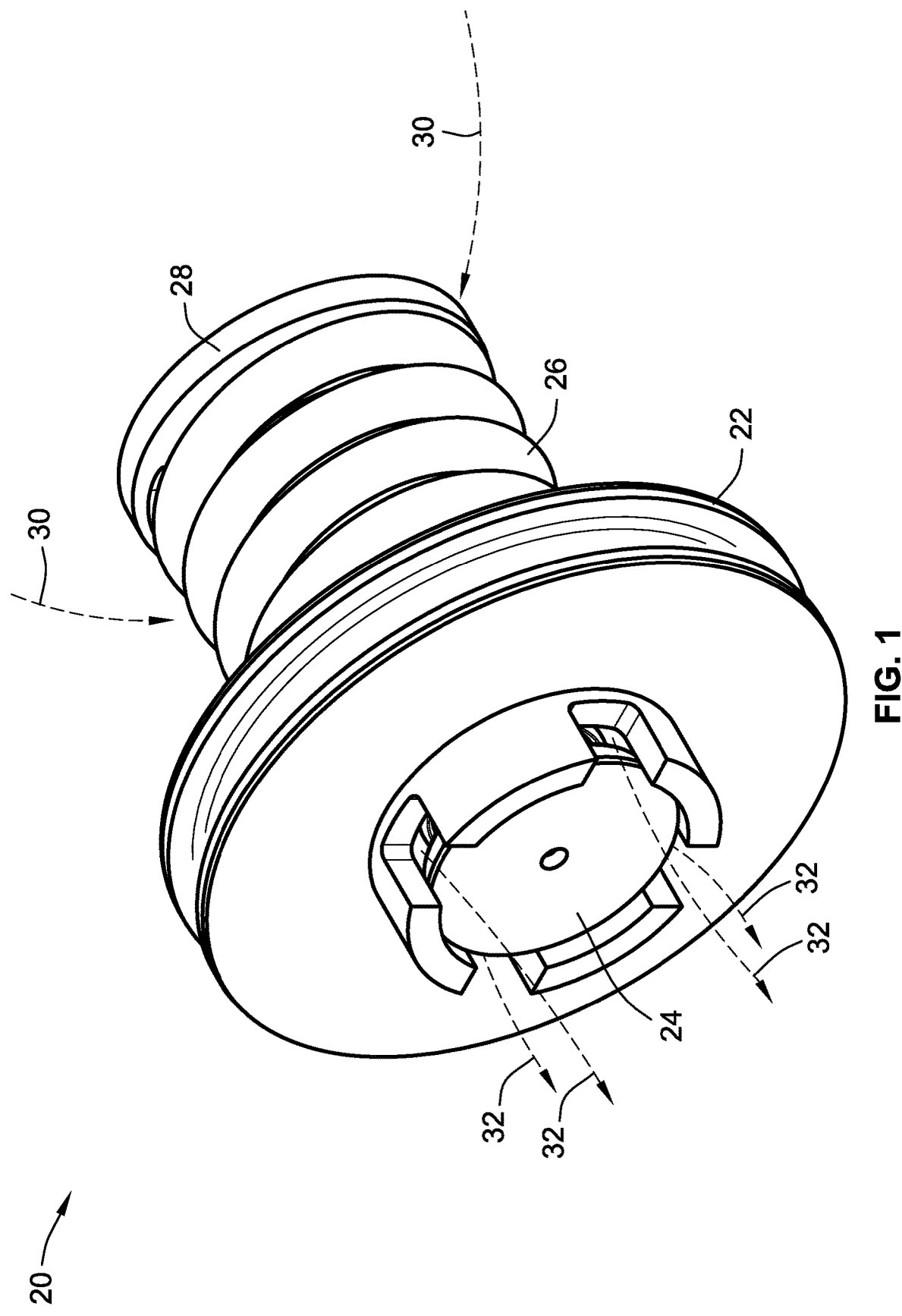
FIG. 1 is a perspective view of an embodiment of a damped check valve having multi-pressure operation according to the teachings herein.

Turning now to FIG. 1, the valve 20 is shown in a perspective view. Valve 20 includes a liner 22 and a poppet 24 movable within liner 22. A biasing element 26 acts between liner 22 and poppet 24 to bias poppet 24 into a closed position. In particular, biasing element is interposed between a flange of liner 22 and a retainer 28 attached to an end of poppet 24 and is in a compressed state such that attempted decompression of biasing element 26 biases poppet 24 into a closed position. Retainer 28 may be attached to poppet 24 using snap rings, clamps, or other mechanical hardware.

Fluid may flow into an interior of liner 22 as is generally shown by flow arrows 30. This fluid is at a pressure which acts upon a face of poppet 24. Once this pressure is at an initial opening pressure sufficient enough to overcome any counter-acting on poppet 24 and the force provide by biasing element 26, poppet 24 will move axially within liner. When sufficiently pressurized, poppet 24 will continue to move within liner 22 to allow fluid to flow freely out of valve 20, as is generally shown by flow arrows 32. "Fluid" as used herein is meant to include any liquid or gas which may be controlled via valving and similar devices.

Although not illustrated, valve 20 may be situated in a flow path through any suitable structure such that fluid is directed through valve 20 using any means as is employed for situating check-valve style flow devices within a flow path. Accordingly, application of valve 20 is not limited to any particular structure or device, or any particular application.

Figure 2:
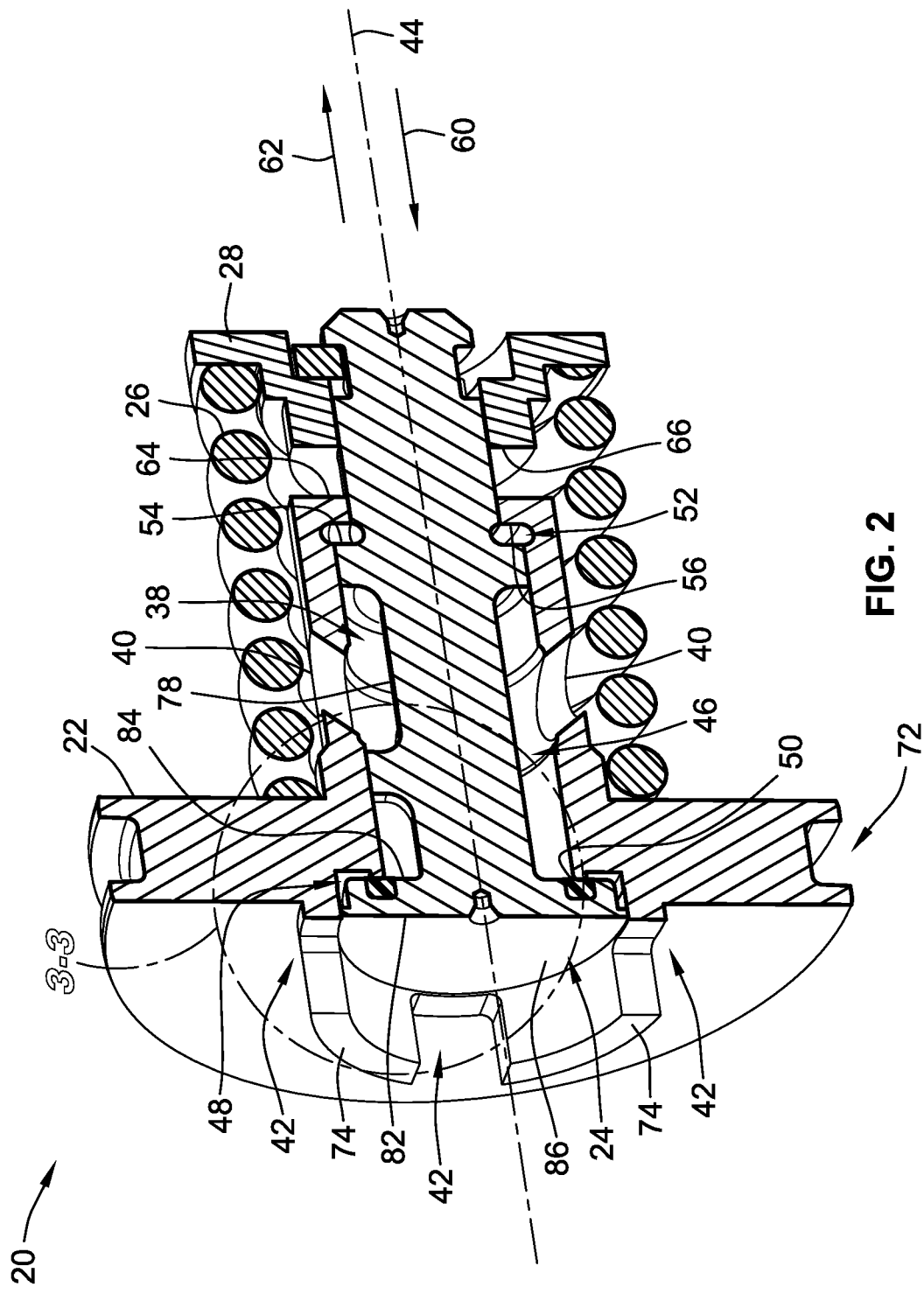
FIG. 2 is a cross section of the valve of FIG. 1 in a closed position.

Turning now to FIG. 2, valve 20 is illustrated in a side cross section. Liner 22 includes at least one inlet port 40, and in the illustrated embodiment a plurality of inlet ports 40 which are equally spaced from one another, communicating fluid surrounding the exterior of liner 22 with an internal flow passage 38 through liner 22. This flow passage 38 is aligned along a longitudinal axis 44 defined by liner 22. Flow passage 38 includes an inlet portion 46 and an outlet portion 48 downstream from inlet portion 46 relative to the direction of fluid flow through valve 20, i.e. the direction moving from inlet ports 40 to one or more outlet ports 42 where fluid exits flow passage 38.

Outlet portion 48 has a diameter which is larger than a diameter of inlet portion 46, as illustrated. Further, a seat 50 is defined within outlet portion 48. When poppet 24 abuts seat 50 as shown, valve 20 is in a closed position. That is, fluid is prevented from flowing from inlet ports 40 and through flow passage 38 to exit outlet ports 42. As indicated above, biasing element 26 acts on poppet 24 to bias the same along longitudinal axis 44 in linear direction 62 such that valve 20 is normally closed.

A variable volume damping cavity 52 is also formed between a first damping face 54 of poppet 24 and a second damping face 56 of liner 24. A radial clearance is formed between first damping face 54 and second damping face 56 such that as poppet 24 moves in direction 62 fluid within damping cavity 52 may flow around first damping face 54 into the inlet portion 46. Simultaneously, fluid in damping cavity 52 flows around second damping face 56 as it is evacuated from damping cavity 52. This action serves to damp the movement of poppet 24, particularly the movement of poppet 24 in direction 62. When moving in direction 60, fluid flows across first and second damping faces 54, 56 into damping cavity 52. The above radial clearances associated with first and second damping faces 54, 56 may be sized to achieve a desired damping characteristic.

As may also be seen in this view, biasing element 26 is constrained between a flange 72 of liner 22 and the above described retainer 28. This biasing element 26 may be selected based on a desired initial opening pressure of valve 20, among other things.

A plurality of extensions 74 extend outwardly from flange 72 as shown. Outlet ports 42 are situated between adjacent extensions 74 as shown. As was the case with inlet ports 40, outlet ports 42 may vary in number from that shown such that there are fewer or greater outlet ports 42.

As introduced above, valve 20 is shown in the closed position such that poppet 24 is seated against seat 50. However, once the fluid pressure acting on poppet 24 is at least at the initial opening pressure, poppet 24 will move in direction 60 along axis 44 to unseat poppet 24 from seat 50. Poppet 24 includes a stem 78 which leads to a head 82. Prior to unseating, fluid pressure initially acts on portion of a first flow face 84 of head 82 of poppet 24. This portion is defined radially between a radial inner face of seat 50 and a radial outer face of stem 78. As will be explained below, however, once poppet 24 unseats from seat 50, this fluid pressure acts against the remaining axially facing area of poppet 24 on the side thereof which is the same as first flow face 84.

The load relationship acting on poppet 24 is the square of the diameter of the area acted upon by the fluid multiplied by fluid pressure. In other words, assuming an initial pressure of $P_1$ and the above mentioned diametrical area of seat 50 in the closed position of $D_1$, loading on poppet 24 (and hence the force acting in the opening direction 60) is proportional $D_1 \times D_1 \times P_1 = F_1$.

However, as may be readily surmised from the foregoing relationship, as the diameter of the area acted upon by the fluid pressure increases, a reduced pressure is required to retain the same loading. Applying this relationship to poppet 24, once poppet 24 unseats from seat 50, a considerably larger diameter is then exposed to the same fluid pressure. As such, the fluid pressure may now be decreased to hold poppet 24 in its open or fully open positions (defined below).

Put differently, the pressure acting on first flow face 84 may be decreased considerably below the initial opening pressure before poppet 24 will move in direction 62 and seat against seat 50. It is this operation which allows for flow control through valve 20 at pressures below its initial opening pressure.

It will also be recognized from inspection of FIG. 2 that movement of poppet 24 along axis 44 in direction 62 is limited via abutment of poppet 24 with seat 50. Likewise, movement of poppet 24 in direction 60 is limited by abutment of a first abutment surface 64 of liner 22 and a second abutment surface 66 of retainer 28.

Figure 3:
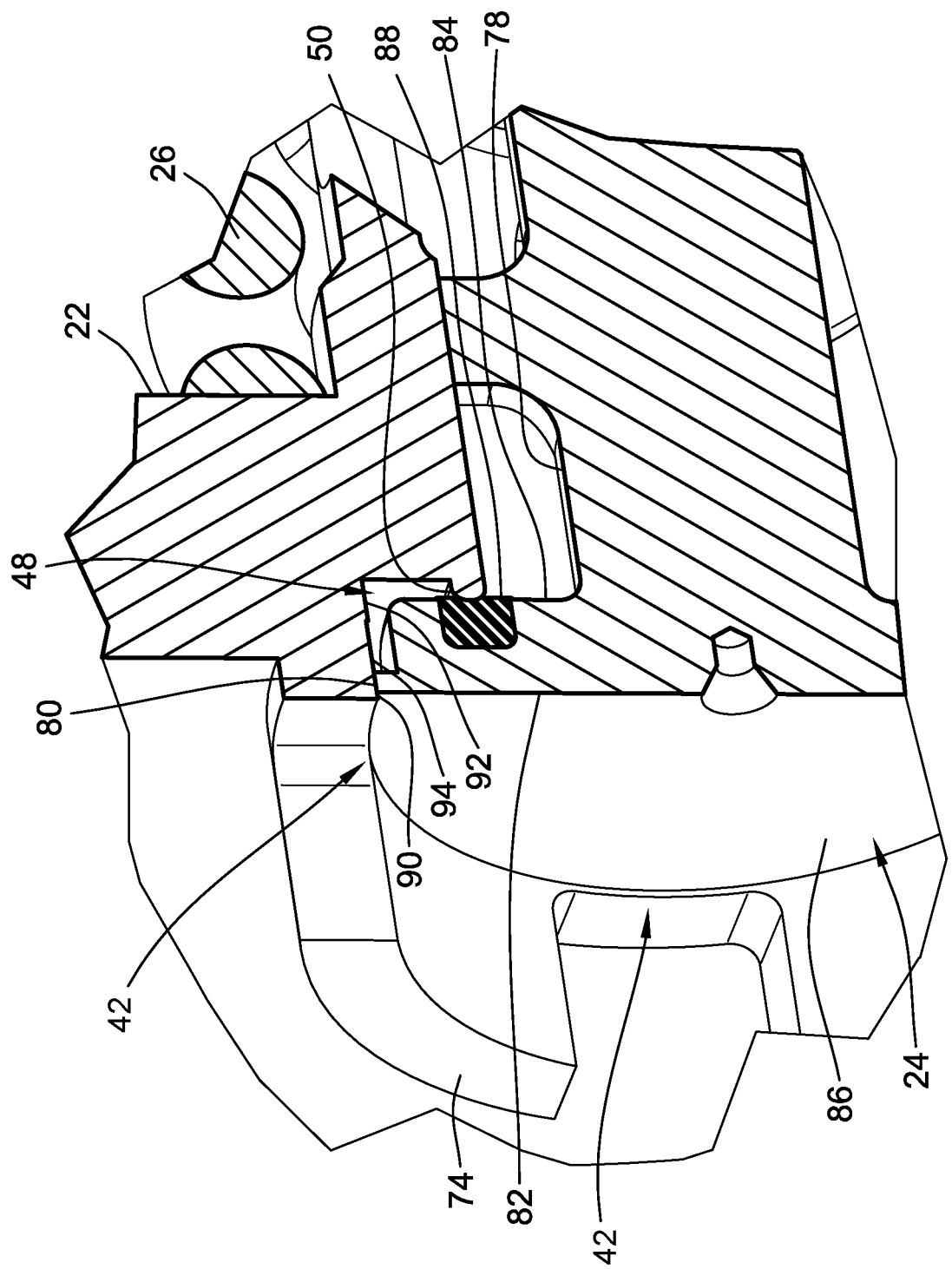
FIG. 3 is a partial cross section of the valve of FIG. 1 in the closed position.

Turning now to FIG. 3, the same illustrates a partial view of the cross section of FIG. 2, particularly the interface of poppet 24 with liner 22 in the region of outlet ports 42. In this view, poppet 24 (and hence valve 20) is in the closed position, i.e. poppet 24 is seated against seat 50. As a result, flow into outlet portion 48 of flow passage 38 is prevented. As may be seen in this view, a seal 88 may be situated on poppet 24 such that it is exposed at first flow face 84. This seal aligns with seat 50 to enhance the sealing capabilities thereof. In other embodiments, seal 88 may be omitted. Further, although seat 50 is generally an annular extending ridge, other seat geometries could be used. For non-limiting examples, seat 50 could simply be a flat axially facing surface of outlet portion 48, or could be the axial protrusion shown with different geometry.

Poppet 24 includes an axially extending sidewall 80 which is disposed between the first and second flow faces 84, 86. This axially extending sidewall 80 is used to open and close outlet ports 42. The axial length of this sidewall 80 defines a dead band region wherein after poppet 24 unseats from seat 50 and moves in direction 60 (see FIG. 2), outlet ports 42 are still closed by sidewall 80 until an upstream edge 94 of sidewall 80 is downstream from a downstream edge 90 of outlet portion 48 which defines outlet ports 42.

As was the case with damping cavity 52 (see FIG. 2), there is a radial clearance between sidewall 80 and a radial wall 92 of outlet portion 48 such that a controlled leakage flow is permitted from outlet portion 48 past sidewall 80 and out of ports 42, once poppet 24 has unseated from seat 50. As one non-limiting example, the radial clearance may be about 0.00015 inches to about 0.0002 inches. The term "about" is used here to allow for typical manufacturing tolerances for such radial clearances. This position of poppet 24 (and hence valve 20) permitting this leakage flow is referred to as the open position, and is discussed in the following relative to FIG. 4.

Figure 4:
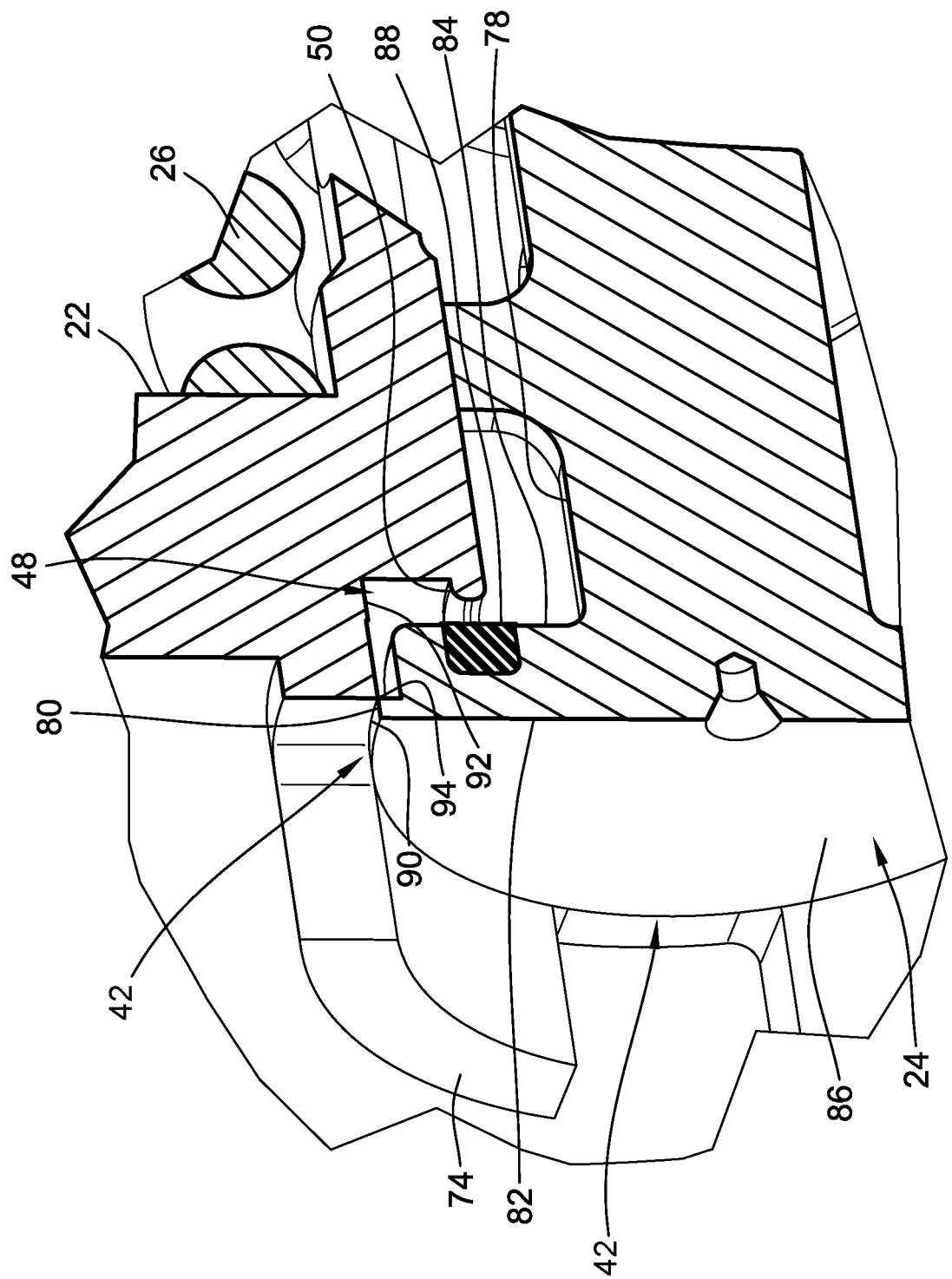
FIG. 4 is a partial cross section of the valve of FIG. 1 in an open position.

Turning now to FIG. 4, poppet 24 is moved in direction 60 along axis 44 such that it, and hence valve 20, is now in an open position. The "open position" in this context means any position of poppet 24 along axis 44 wherein it is unseated from seat 50 but the upstream edge 94 thereof remains at or upstream from downstream edge 90. In this position, fluid within inlet portion 46 of flow passage 38 can flow into outlet portion 48. However, full flow out of outlet ports 42 is still prevented as the upstream edge 94 of sidewall 80 is not axially downstream from the downstream edge 90 of outlet portion 48. It will be noted that, in FIG. 4, poppet 24 is nearing the limit of its open position and is about to transition into a fully open position as is shown and described below relative to FIG. 5.

Despite the position of sidewall 80 shown in FIG. 4, as stated above a sufficient radial clearance exists in this region between sidewall 80 and face 92 of outlet portion 48 so that a controlled leakage flow is possible. This leakage flow provides flow control prior to poppet 24 exposing ports 42. This leakage flow is a function of the aforementioned radial clearance between sidewall 80 and the liner, as well as the axial length of sidewall 80. In particular, the leakage flow is proportional to the cube of the radial clearance, and is directly proportional to the axial length of the flow path across the radial clearance. As such, the impact of the radial clearance sizing may be readily surmised. The sizing of this clearance is a function of the desired leakage flow, and thus can be varied by application. It is also reiterated that movement from the closed position through and past the open position may be achieved under a pressure which is less than the pressure required to unseat poppet 24 from seat 50.

Figure 5:
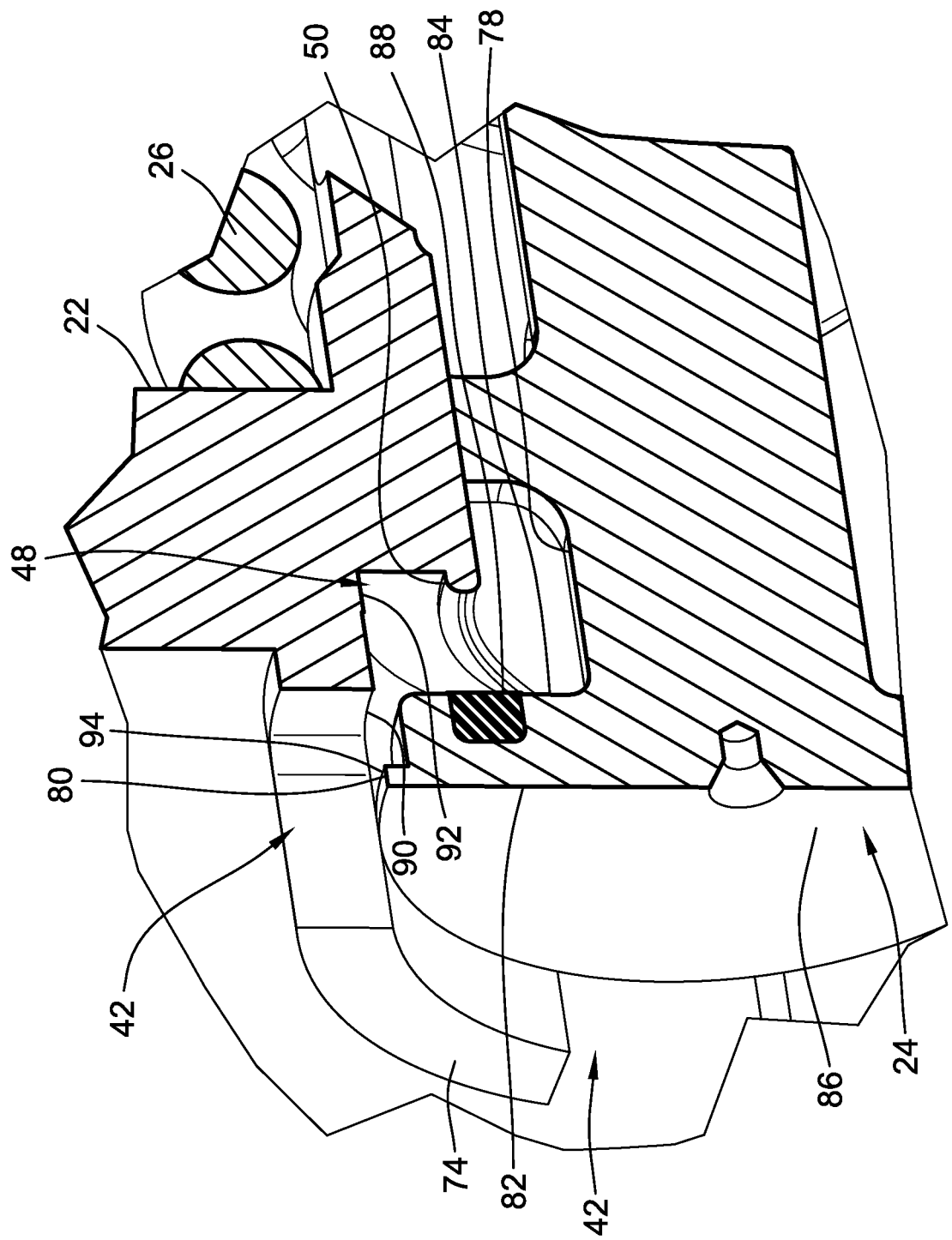
FIG. 5 is a partial cross section of the valve of FIG. 1 in a fully open position.

Turning now to FIG. 5, the same illustrates poppet 24 and hence valve 20 in the fully open position. In this position upstream edge 94 is entirely downstream from downstream edge 90 of outlet portion 48. As indicated above, the fully open position has a maximum limit wherein surfaces 64, 66 (see FIG. 2) abut. At that position, full flow is possible through ports 42.

Figure 6:
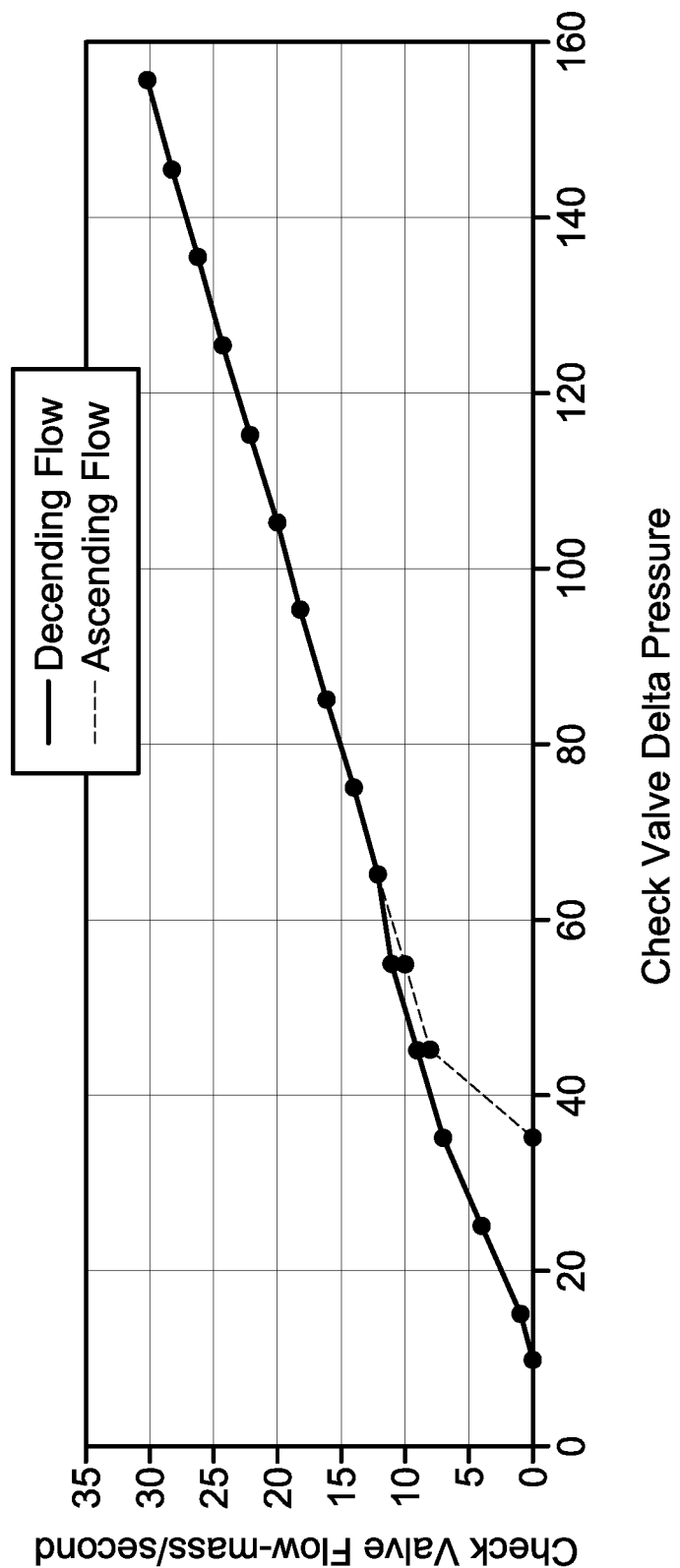
FIG. 6 is a plot illustrating flow characteristics through the valve.

Turning lastly to FIG. 6, the same illustrates two plots of flowrate through valve 20 vs. the pressure differential across valve 20. One plot illustrates ascending flow, i.e. a flow through valve 20 to transition the same from the closed position through the open position and to the fully open position. As may be seen in this particular plot, the initial opening pressure (expressed as a pressure differential across valve 20) is approximately 35 psi. From that differential, flow steadily increases to its maximum rate at a maximum pressure differential.

The second plot illustrates descending flow, i.e. flow through valve 20 to transition it from the fully open position back to the closed position. This flow begins at the same maximum flow rate and pressure differential as the ascending flow. However, as the pressure differential decreases, it should be noted that flow remains possible at pressure values less than the initial opening pressure of 35 psi. Indeed, flow may continue until a pressure differential value of less than 10 psi. In other words, the flow rate through valve 20 may be controlled at pressures less than the initial opening pressure of valve 20. It will be recognized that the specific pressure and flowrate values mentioned above should be taken by way of example only.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A check valve, comprising:
    a liner, the liner defining a flow passage aligned along a longitudinal axis defined by the liner and having a radial wall forming a plurality of outlet grooves between a plurality of extensions at an outlet portion thereof;
    a poppet, the poppet having a first flow face and a second flow face and an axially extending sidewall interposed between the first flow face and the second flow face;
    a biasing element operably coupled between the poppet and the liner to bias the first flow face against an annular seat defined by the liner in a closed position; and
    wherein the first flow face is configured such that a first fluid pressure is required to move the poppet from the closed position to an open position wherein the poppet is unseated from the annular seat and a second fluid pressure is required to hold the poppet in the open position, the second pressure being less than the first pressure; and
    wherein a radial clearance is defined between the axially extending sidewall of the poppet and the radial wall of an outlet portion of the liner such that a controlled leakage flow is permitted from the outlet portion past the axially extending sidewall and out of the outlet grooves once the poppet has unseated from the annular seat.

2. The check valve of claim 1, wherein the flow passage has an inlet portion, and wherein the outlet portion is downstream from the inlet portion relative to a direction of the flow of fluid through the flow passage.

3. The check valve of claim 2, wherein the poppet is movable from the closed position to the open position wherein the poppet is unseated from the annular seat and from the open position to a full open position, wherein in the full open position an entirety of the axially extending sidewall is downstream relative to the direction of fluid flow through the flow passage from a downstream edge of the outlet portion.

4. The check valve of claim 1, wherein a first portion having a first area of the first flow face is arranged such that fluid will contact said first portion in the closed position, and wherein a second portion of the first flow face having a second area greater than the first area is arranged such that fluid will contact said second portion when the poppet is unseated from the annular seat in the open position.

5. The check valve of claim 1, further comprising a seal, the seal situated in the poppet such that a portion of the seal is exposed on the first flow face.

6. A check valve, comprising:
a liner, the liner defining a flow passage aligned along a longitudinal axis defined by the liner and having a radial wall forming a plurality of outlet grooves between a plurality of extensions at an outlet portion thereof;
a poppet, the poppet having a first flow face and a second flow face and an axially extending sidewall interposed between the first flow face and the second flow face;
a biasing element operably coupled between the poppet and the liner to bias the first flow face against an annular seat defined by the liner in a closed position; and
wherein a first portion having a first area of the first flow face is arranged such that fluid will contact said first portion in the closed position, and wherein a second portion of the first flow face having a second area greater than the first area is arranged such that fluid will contact said second portion when the poppet is unseated from the annular seat in an open position; and
wherein a radial clearance is defined between the axially extending sidewall of the poppet and the radial wall of an outlet portion of the liner such that a controlled leakage flow is permitted from the outlet portion past the axially extending sidewall and out of the outlet grooves once the poppet has unseated from the annular seat.

7. The check valve of claim 6, wherein the flow passage has an inlet portion, and wherein the outlet portion is downstream from the inlet portion relative to a direction of the flow of fluid through the flow passage.

8. The check valve of claim 7, wherein the poppet is movable from the closed position to the open position wherein the poppet is unseated from the annular seat and from the open position to a full open position, wherein in the full open position an entirety of the axially extending sidewall is downstream relative to the direction of fluid flow through the flow passage from a downstream edge of the outlet portion.

9. The check valve of claim 7, wherein the inlet portion of the flow passage has a first diameter and the outlet portion of the flow passage has a second diameter greater than the first diameter.

10. The check valve of claim 6, wherein the first flow face is configured such that a first fluid pressure is required to move the poppet from the closed position to the open position wherein the poppet is unseated from the annular seat and a second fluid pressure is required to hold the poppet in the open position, the second pressure being less than the first pressure.

11. The check valve of claim 6, further comprising a retainer affixed to the poppet, the biasing element trapped between the retainer and the liner.

12. The check valve of claim 6, wherein a plurality of inlet ports are formed through the liner such that fluid surrounding an exterior of the liner is in communication with the flow passage via the plurality of inlet ports.

13. A check valve, comprising:
a liner, the liner defining a flow passage aligned along a longitudinal axis defined by the liner, the flow passage having an inlet portion and an outlet portion downstream from the inlet portion relative to the direction of the flow of fluid through the flow passage, and the liner further having a radial wall forming a plurality of outlet grooves between between a plurality of extensions at an outlet portion thereof;
a poppet, the poppet having a first flow face and a second flow face, wherein an axially extending sidewall of the poppet is interposed between the first and second flow faces;
a biasing element operably coupled between the poppet and the liner to bias the first flow face against an annular seat defined by the liner in a closed position of the check valve;
wherein the poppet is movable from the closed position to an open position wherein the poppet is unseated from the annular seat and from the open position to a full open position, wherein in the full open position an entirety of the axially extending sidewall is downstream relative to the direction of fluid flow through the flow passage from a downstream edge of the outlet portion; and
wherein a radial clearance is formed between the axially extending sidewall and the outlet portion of the flow passage such that a leakage flow is permitted from the inlet portion through the outlet portion in the open position.

14. The check valve of claim 13, wherein a portion of the inlet portion of the flow passage is a variable volume damping cavity formed between a first damping face of the poppet and a second damping face of the liner, wherein a volume of the damping cavity varies based on a position of the poppet within the liner.

15. The check valve of claim 14, wherein a radial clearance is formed between the first damping face and the inlet portion of the flow passage such that a leakage flow is permitted from the damping cavity to the remainder of the inlet portion of the flow passage.

16. The check valve of claim 13, wherein the first flow face is configured such that a first fluid pressure is required to move the poppet from the closed position to the open position wherein the poppet is unseated from the annular seat and a second fluid pressure is required to hold the poppet in the open position, the second pressure being less than the first pressure.

17. The check valve of claim 13, wherein a first portion having a first area of the first flow face is arranged such that fluid will contact said first portion in the closed position, and wherein a second portion having a second area greater than the first area is arranged such that fluid will contact said second portion when the poppet is unseated from the annular seat in the open position.

18. The check valve of claim 13, wherein the inlet portion of the flow passage has a first diameter and the outlet portion of the flow passage has a second diameter greater than the first diameter.

* * * * *